April 8, 1952 H. WEISS ET AL 2,591,986
ONE-PIECE TIE DOWN DEVICE AND GRABHOOK
Filed Feb. 23, 1951
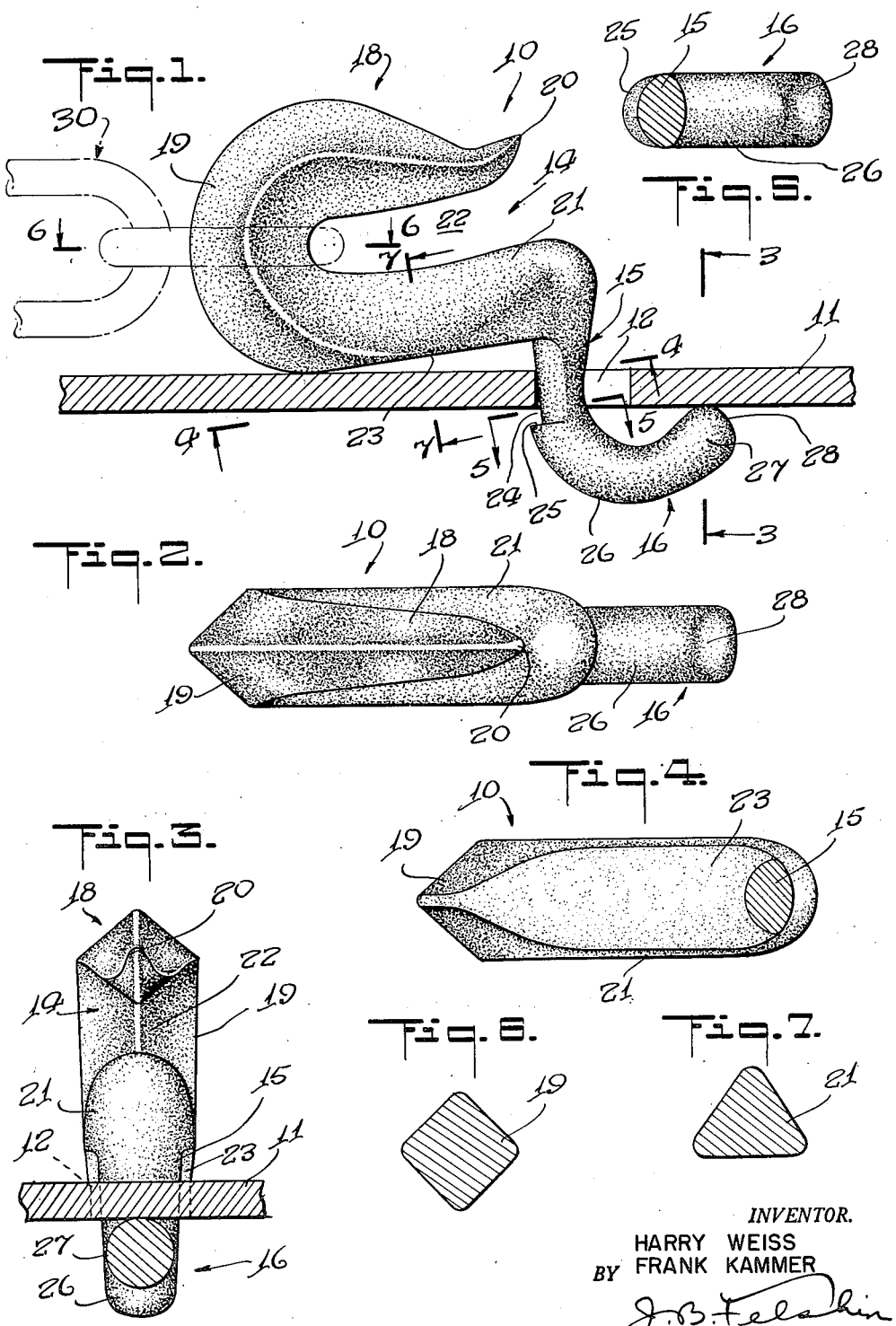
INVENTOR.
HARRY WEISS
BY FRANK KAMMER
ATTORNEY Patented Apr. 8, 1952

2,591,986

UNITED STATES PATENT OFFICE 2,591,986

ONE-PIECE TIE DOWN DEVICE AND GRABHOOK

Harry Weiss and Frank Kammer, New York, N. Y.

Application February 23, 1951, Serial No. 212,432

3 Claims. (Cl. 24—230.5)

1

This invention relates to a combination one piece tie down device and grab hook. It is particularly directed to devices for anchoring motor vehicles to trucks in which the motor vehicles are shipped.

Devices for tying down or anchoring motor vehicles have been known which consist of a member having a body portion formed with a central opening, and a neck portion extending from the body and insertable through a hole in a sheet metal element, a chain link passing through said central opening in the body, and a grab hook anchored to the link. Such devices have the inherent weakness that the link sometimes opens where it is welded. Furthermore such an arrangement comprises at least three parts.

It is another object of the present invention to provide a combination tie down device and grab hook comprising a single member having at one end an extension adapted to be received through a hole in a sheet metal plate for contacting one side of said plate, and at its opposite end being formed with a grab hook to engage a chain or a link of a chain, and contacting the opposite side of said plate, thereby eliminating the connecting link elements which are necessary in prior devices.

Yet another object of this invention is to provide a device of the character described comprising a hook portion, an offset portion extending from one end of the hook portion and adapted to pass through an opening in the sheet metal plate, and a bent back portion extending from the offset portion, having an end adapted to contact one side of said sheet metal plate, while the grab hook contacts the opposite side of the sheet metal plate.

A still further object of this invention is to provide a device of the character described in which the portion which passes through the opening in the sheet metal plate is formed at its underside with a groove providing a shoulder to prevent the device from accidentally falling out or becoming dislodged from the sheet metal plate.

Yet another object of this invention is to provide a compact, strong and durable device of the character described which shall be relatively inexpensive to manufacture, which shall fit plates of narrow thickness and holes of various sizes, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, Fig. 1 is a side elevational view of a device embodying the invention, showing the same engaged with a sheet metal plate, and showing a chain connected to the hook portion of said device;

Fig. 2 is a front elevational view of a device embodying the invention;

Fig. 3 is a cross-sectional view taken on line 3—3 of Fig. 1;

Fig. 4 is a cross-sectional view taken on line 4—4 of Fig. 1;

Fig. 5 is a cross-sectional view taken on line 5—5 of Fig. 1;

Fig. 6 is a cross-sectional view taken on line 6—6 of Fig. 1; and

Fig. 7 is a cross-sectional view taken on line 7—7 of Fig. 1.

Referring now in detail to the drawing, 10 designates a combination hook and tie down device embodying the invention, and 11 comprises a sheet metal plate formed with a through hole 12 and engaged by said device 10. The sheet metal plate 11 may comprise a wall of a chassis frame of a truck or any other suitable anchoring member.

The device 10 comprises generally a grab hook portion 14, an offset portion 15 extending laterally therefrom, and a bent back extension 16 extending from the offset portion 15. The grab hook 14 comprises a finger 18 extending from a U-shaped portion 19. Portions 18 and 19 may be of diamond cross-sectional shape. The finger 18 tapers to a point 20. Extending from portion 19 is an arm or portion 21, spaced from the finger 18 and forming therewith a slot 22. Slot 22 may be inclined and slightly curved longitudinally. Portion 21 may be substantially triangular in cross-section, as shown in Fig. 7 of the drawing. Arm 21 may extend beyond the finger 18, as shown in Fig. 1 of the drawing. Said arm 21 is formed with a flat rear surface 23.

The offset portion or lateral extension 15 extends from the outer end of arm 21 away from the point 20 and is formed at its side adjacent surface 23 with a groove or depression 24 providing a shoulder abutment 25 at the remote end of the groove and facing the hook. The bent back portion 16 which extends from portion 15 comprises a curved portion 26 extending away from the offset portion 15 and a portion 27 bent back and having an outer end 28. The cross-section of the offset portion 15 at the groove 24 is substantially oval. The device is so constructed that it may be engaged within openings of various size in plates of various thicknesses. It will be noted that the lower end of the rear surface 23 contacts one side of the anchoring plate 11, whereas the outer end 28 contacts the opposite side of said anchoring plate.

It will also be further understood that the edge of the opening 12 contacts the underside of the groove portion 15. If the hook portion 14 were swung away from the plate 11, the shoulder 25 would contact the edge of the opening 12 to prevent the device from accidentally falling out. A link chain 30 may be engaged with the hook 14 as shown in Fig. 1 of the drawing in dot-dash lines.

It will now be understood that the device 10 comprises a combination hook 14 and tie down device. It may be engaged within a hole within an anchoring plate and any link chain may be engaged with the hook. The device is made in one piece and is relatively strong.

Prior tie down devices comprise a member engageable within an opening in a plate, a grab hook, and a link connecting the grab hook with a central opening in said member. It was thus necessary to put a link through an opening in a grab hook and through an opening in a tie down device, and said link then had to be welded in place. Such links proved to be weak points in the construction. The connecting link elements of such three piece devices is eliminated with the present construction, which is hence cheaper to produce, and yet stronger and more efficient.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention we claim as new and desire to secure by Letters Patent:

1. A device of the character described comprising a hook having a finger, a bent back portion from which the finger extends, and an arm extending from said bent back portion, said arm being adapted to contact one surface of an anchoring plate, a portion offset from the outer end of said arm and adapted to pass through an opening in said plate, and a curved back portion extending from said offset portion and having an outer end adapted to contact the opposite surface of said plate, said arm having a flat surface adjacent said plate, said offset portion being formed on one side with a depression providing a shoulder spaced from said arm and adapted to engage an edge of the opening in the plate to prevent said device from accidentally falling out.

2. A combination tie down and grab hook device integrally formed from a single piece of metal, comprising an offset portion insertable within a hole in a plate, a grab hook extending from one end of said offset portion on one side of said plate, and a bent back portion extending from the other end of said offset portion on the opposite side of said plate, and in a direction away from said grab hook, said offset portion forming a shoulder with said bent back portion at their junction, to prevent said device from accidentally falling out, said shoulder having an abutment facing the grab hook and being arranged on the side of the offset portion opposite to that from which the bent back portion extends.

3. In combination with an apertured support, a substantially U-shaped hook member, one of the arms of said U-shaped hook member adapted to engage one face of the support, a lateral extension formed on the end of the arm that engages the support, said lateral extension adapted to pass through the aperture in the support, a curved portion formed on the outer end of the lateral extension and extending away from said hook having its free end adapted to engage the other face of the support, said lateral extension being formed with a shoulder facing the U-shaped hook member arranged on the side of the lateral extension opposite to that from which the curved portion extends, said shoulder adapted to engage said other face of the support adjacent the aperture to prevent the hook member from becoming disengaged from the support.

HARRY WEISS.
FRANK KAMMER.

REFERENCES CITED

The following references are of record in the file of this patent:

UNITED STATES PATENTS

| Number | Name | Date |
| --- | --- | --- |
| 443,473 | Boiteau | Dec. 23, 1890 |
| 651,091 | Williams | June 5, 1900 |
| 2,322,576 | Huebshman | June 22, 1943 |